United States Patent [19]

Rodgers, III

[11] 4,253,116

[45] Feb. 24, 1981

[54] TELEVISION SYNCHRONIZING SYSTEM OPERABLE FROM NONSTANDARD SIGNALS

[75] Inventor: Robert L. Rodgers, III, Lancaster, Pa.

[73] Assignee: RCA Corporation, New York, N.Y.

[21] Appl. No.: 98,179

[22] Filed: Nov. 27, 1979

[51] Int. Cl.³ .............................................. H04N 5/04
[52] U.S. Cl. .................................... 358/149; 358/158
[58] Field of Search .............. 358/148, 149, 150, 153, 358/158, 165; 328/63; 331/20

[56] References Cited

U.S. PATENT DOCUMENTS

| | | | |
|---|---|---|---|
| 3,688,037 | 8/1972 | Ipri | 328/63 |
| 3,846,584 | 11/1974 | Itoh | 331/20 |
| 3,878,335 | 4/1975 | Balaban | 328/63 |
| 3,899,635 | 8/1975 | Steckler | 358/148 |
| 4,015,288 | 3/1977 | Ebihara | 358/148 |
| 4,025,952 | 5/1977 | Eckenbrecht | 358/148 |
| 4,063,288 | 12/1977 | Eckenbrecht | 358/148 |
| 4,096,528 | 6/1978 | Tuma | 358/148 |
| 4,144,544 | 3/1979 | Fernsler | 358/158 |
| 4,203,076 | 5/1980 | Yamashita | 358/158 |

Primary Examiner—Benedict V. Safourek
Assistant Examiner—Michael Allen Masinick
Attorney, Agent, or Firm—Eugene M. Whitacre; Paul J. Rasmussen; William H. Meise

[57] ABSTRACT

A synchronizing signal for a television camera includes a count-down system by which standard horizontal and vertical synchronizing signals are generated and added to the video signals being produced. In order to allow the camera to be synchronized to a nonstandard source of synchronizing signals such as a television game, computer with TV display, another television camera or a video recorder for allowing split-screen applications, the count-down system is phase-locked to the external sync portions of the external sync signals. Thus, standard sync signals are produced by the camera at a rate controlled by a nonstandard sync source. In order to prevent slewing of the system during the vertical equalizing or synchronizing portions of the external sync signals, the phase-lock loop which controls the frequency of the count-down system is inhibited during at least the vertical synchronizing and equalizing pulse portions of the external synchronizing signals.

3 Claims, 4 Drawing Figures

TELEVISION SYNCHRONIZING SYSTEM OPERABLE FROM NONSTANDARD SIGNALS

BACKGROUND OF THE INVENTION

This invention relates to a television synchronizing system which generates standard interlaced television synchronizing signals from external synchronizing signals which may be nonstandard.

Television cameras are required to generate synchronizing signals in synchronism with the video to be reproduced so that the video image may be maintained in proper position on a raster. Studio cameras ordinarily include elaborate sync signal generators. These sync signal generators are adapted for synchronization with a master source generated within the studio (gen locking).

In the field of industrial and surveillance cameras, cost considerations preclude complex sync generators. Nevertheless, it may be desirable to synchronize the internal sync generator to an external source. For example, in the simpliest systems it may be desirable to phase-lock the internal sync signal generator of a camera to a zero crossing of the sixty Hz power line. Thus, when several surveillance cameras are used in different locations and monitored from a central location, the monitored picture does not roll when switching from one camera to another. Unfortunately, other uses of industrial and surveillance cameras place more stringent requirements on the synchronizing capability of the internal generator of each camera than are experienced in studio camera uses. For example, industrial and surveillance cameras may be used in split-screen applications, necessitating both horizontal and vertical-frequency synchronization. Additionally, a camera may be required to be synchronized with a source of nonstandard television synchronizing signals for split-screen use, as with a home computer, a video game, or an old-style camera, any of which may generate noninterlaced signals or RS330 (lacking horizontal-rate serrations in the vertical synchronizing interval) signals, or noninterlaced RS330 signals.

Vertical count-down systems for generating interlaced vertical and horizontal synchronizing signals are described in U.S. Pat. No. 3,688,037, issued Aug. 29, 1972 to Ipri, and U.S. Pat. No. 3,878,335, issued Apr. 15, 1975 to Balaban and elsewhere. In such systems, the phase detector is coupled to the horizontal-rate signals developed by a synchronizing signal separator for controlling an oscillator and counter arrangement for generating horizontal-rate pulses in synchronism with the external horizontal-rate signals. Internal vertical-rate pulses are generated by a logic circuit coupled to a counter which is in turn coupled to the phase-lock loop. Attention in such prior art is directed to stabilizing the internally generated vertical synchronizing signal by the use of logic systems for identifying the external vertical synchronizing signal.

U.S. Pat. No. 3,866,584, issued Nov. 5, 1974 to Itoh and U.S. Pat. No. 4,144,544, issued Mar. 13, 1979 to Fernsler are directed to stabilizing the image displayed on the raster of a television apparatus when the source of signals is a VTR in which a step change in phase of the horizontal synchronizing signal occurs at a time just prior to the beginning of the vertical blanking interval. In such systems, in order to display an undistorted image on the raster, the internal horizontal synchronizing signal of the display device must be totally synchronized to the new phase of the horizontal synchronizing signal from the VTR by the time of beginning of scan (at the top of the raster), and this is accomplished by increasing the loop gain of the phase-lock loop by which the internal horizontal synchronizing signals are generated.

For split-screen use of a surveillance camera in conjunction with a VTR or other source of nonstandard signals, the internal sync signals of the camera may continue at a constant rate, since it is the display device rather than the camera which is arranged to slew to compensate for transient errors in the VTR sync signals. Consequently, distortions of the displayed image may occur if the horizontal synchronizing signals of the camera are locked to the horizontal synchronizing signals of the VTR, since it is the display apparatus which must slew to correct the image. Furthermore, when the source with which the camera is to be synchronized for split-screen use produces RS330 signals, the camera receives no horizontal synchronizing signals at all during the vertical synchronizing interval, and may drift away from the horizontal synchronizing signal phase. If, in addition, the external synchronizing signal source is noninterlaced, phase perturbations in the horizontal-rate signal may occur in the vicinity of the vertical synchronizing and blanking intervals. It is desirable that a camera produce standard synchronizing signals at the horizontal rate of an external source whether or not the external source produces a standard signal.

SUMMARY OF THE INVENTION

A television synchronizing apparatus is adapted for generating internal vertical and horizontal synchronizing signals from a source of composite external vertical and horizontal synchronizing signals which may be nonstandard. The apparatus comprises a phase detector having a first input coupled to the source of external signals for comparing the phase of the external signals with signals applied to a second input for producing a raw control signal indicative of their relative phase. A filter is coupled to the phase detector for filtering the raw control signal to form a second control signal. A controllable oscillator is coupled to the filter for producing oscillations at a frequency controlled by the second control signal. A first counter is coupled to the oscillator and to the phase detector for forming a phase-lock loop. The first counter counts the oscillations to produce internal horizontal-rate synchronizing signals phase-locked to the external horizontal synchronizing signals. A resettable counter is coupled to the first counter for producing internal vertical synchronizing signals in synchronism with the external vertical synchronizing signals. Inhibiting means are coupled to the phase detector and to the resettable counter for inhibiting operation of the phase detector during at least the equalizing and vertical synchronizing portions of the synchronizing signals.

DESCRIPTION OF THE INVENTION

Figure 1:
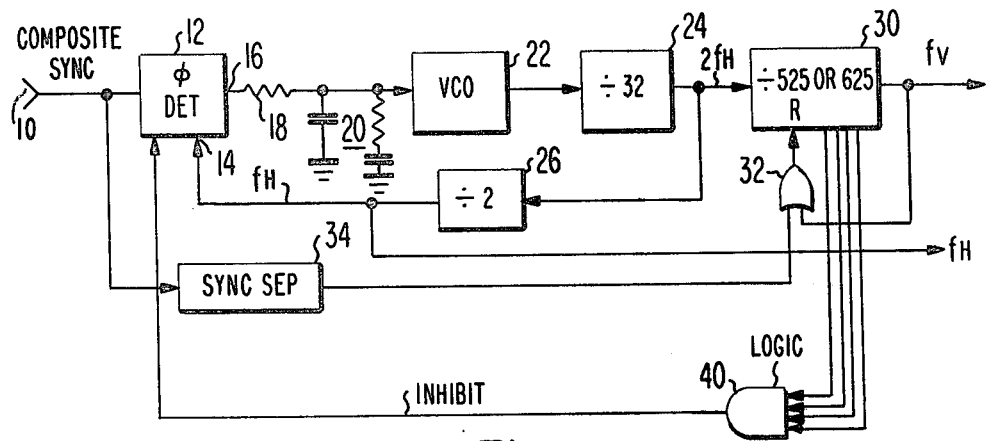
FIG. 1 illustrates a block diagram form a synchronizing signal generator for generating internal vertical and horizontal synchronizing signals from an external source of composite synchronizing signals which may be nonstandard.

In FIG. 1, composite synchronizing signals from an external source are applied by way of an input terminal 10 to a first input of a phase detector 12 for comparison with signals applied to a second input terminal 14 of the phase detector. Phase detector 12 is a type two phase detector for producing currents of first or second polarities at an output terminal 16 in a magnitude depending upon the phase relation of the input signals. The output current from terminal 16 is applied through a resistor 18 to a phase-lock filter designated generally as 20 and of known standard form. The filtered signal is applied to a control input terminal of a voltage-controlled oscillator (VCO) 22, which may operate for example at 1.008 MHz. The output of the oscillator is coupled to a divide-by-32 counter 24 to produce a signal at 31,500 Hertz (2 FH). The 2 FH signal is applied to a divide-by-2 counter where the frequency is divided by two to produce a signal at the horizontal frequency (FH) for application to input terminal 14 of phase detector 12 to close a degenerative phase-lock loop (PLL) by which the FH signals are phase-locked to the horizontal components of the composite sync signal applied to terminal 10. The FH signals produced by counter 26 are also coupled for utilization elsewhere in the apparatus as for synchronizing the deflection of a vidicon (not shown) of a camera as described previously.

A divide-by-525 counter 30 has an input coupled to counter 24 to receive 2 FH signals as an input and divides by 525 to produce a vertical-frequency (FV) signal interlaced with the internal FH signal. Counter 30 is reset by the output signal of an OR gate 32 which receives an FV signal from the output of counter 30 and an external vertical sync signal from a sync separator 34.

A logic circuit 40 has a plurality of inputs coupled to various points within counter 30 for producing a signal during at least the vertical synchronizing and equalizing pulse intervals. Such logic circuits are well-known in the art and are described for example in the aforementioned Ipri patent. The ouput signal produced by logic circuit 40 is applied to phase detector 12 to inhibit the operation of detector 12 during at least the vertical synchronizing and equalizing pulse intervals and for preventing generation of a current of either polarity at output terminals 16 during those intervals. Thus, phase errors between the vertical and the horizontal-rate components of the external composite sync signal due to noninterlaced signals cannot perturb the operation of the VCO 22, and also prevents perturbations which may result from nonstandard or varying equalizing pulses. Further, the presence or absence of horizontal-rate pulses during the vertical synchronizing portions of an RS330 external signal cannot perturb the phase-lock loop or affect the frequency of VCO 22. Thus, the phase-lock loop and VCO 22 "coast" or remain unaffected by external sync through the vertical synchronizing and equalizing pulse intervals, and the timing of the horizontal-rate internal synchronizing signals is taken only from the active video portions of the external synchronizing signals.

Logic circuit 40 may be adapted so as to produce an inhibit signal five horizontal lines before the beginning of the vertical blanking interval and extending through the entire vertical equalizing interval, as known. This inhibits the phase detector and phase-lock loop from five lines before the vertical blanking interval until the end of the equalizing pulse interval, thus preventing perturbation of the PLL by the phase shifts caused by head-switching of a video tape recorder when such a recorder is the source of the external composite synchronizing signal.

Thus, when the synchronizing signal generator of FIG. 1 is used in a camera, the output signal from the camera is synchronized to the video-interval portions of the external synchronizing signal, and the camera signal may be used in a split-screen mode with the video from the external source.

Figure 2:
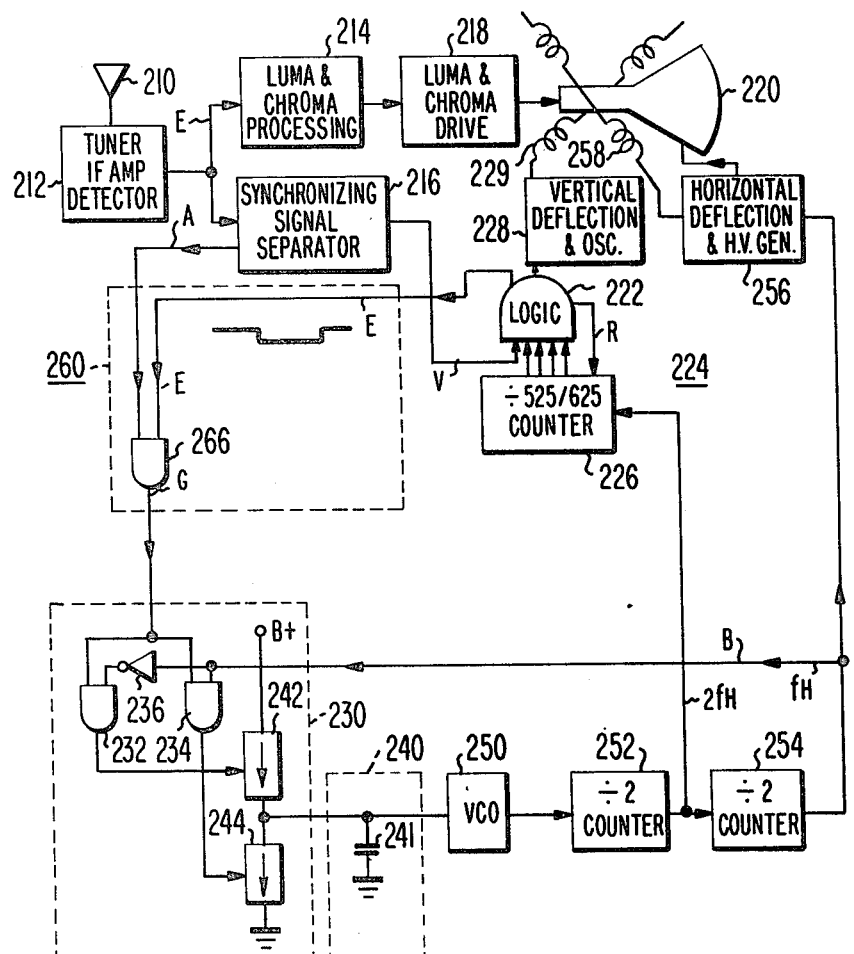
FIG. 2 illustrates in the context of a television receiver an arrangement for generating internal synchronizing signals in which an external gate is used to inhibit the phase detector.

FIG. 2 illustrates in the context of a television receiver an arrangement embodying the invention. In FIG. 2, the receiver includes antenna 210 for receiving broadcast television signals. Antenna 210 is coupled to a tuner, intermediate-frequency (IF) amplifier and video detector illustrated together as a block 212, for producing composite video which is coupled by way of a conductor E to appropriate luminance and chrominance processing circuits illustrated as a block 214 and also to a synchronizing signal separator illustrated as a block 216. The luminance and chrominance information generated by processing circuit 214 is coupled to the elements (not shown) of a kinescope 220 by means of appropriate luminance and chrominance drive circuits illustrated as a block 218.

Synchronizing signal separator 216 separates the vertical synchronizing signals from the composite video and couples them by way of a conductor V to the logic portion 222 of a vertical count-down arrangement designated generally as 224, which also includes the divide-by-525 counter 226. Vertical count-down arrangement 224 produces counter derived vertical drive signals which are synchronized by the vertical synchronizing pulses accepted as such by logic circuit 222. As mentioned, such count-down arrangements are known and are described for example in the aforementioned Ipri and Balaban patents.

The vertical drive signals produced by logic circuit 222 are applied to a vertical deflection circuit 228, which produces a recurrent sawtooth current through vertical deflection windings 229 associated with kinescope 220.

Synchronizing signal separator 216 also separates horizontal synchronizing signals from the composite video and applies them by way of a conductor A to a logic circuit designated generally as 260 which acts as a switch interposed between sync signal separator 216 and a phase detector 230. Generally speaking, logic circuit 260 allows synchronizing pulses to flow to phase detector 230 for locking the horizontal deflection drive to the synchronizing signal except during preselected intervals about the vertical blanking intervals. During such preselected intervals, the phase detector and the PLL do not respond to any synchronizing signals. The synchronizing pulses allowed to pass through logic circuit 260 are applied to a phase detector 230 which includes first and second AND gates 232 and 234, each of which has an input coupled to conductor G. A phase-lock loop filter designated generally as 240 includes a filter capacitor 241, one end of which is connected to ground. The other end of capacitor 241 receives charging current from B+ through gated current source 242. A second gated current source 244 is coupled in parallel with capacitor 241 for discharging the capacitor. Gated current source 242 is controlled by the output of AND gate 232, and gated current source 244 is controlled by the output of AND gate 234. The output signal of phase detector 230 is filtered by loop filter 240 and applied to a VCO illustrated as a block 250. Oscillator 50 produces output signals at a high frequency such as 504 KHz, which are coupled to the input of a divide-by-16 counter 252. The 2 FH output of counter 252 is applied to counter 226 as a clock input and to a divide-by-2 counter 254 to generate horizontal deflection drive signals at FH. The FH signals from counter 254 are applied to a horizontal deflection and high voltage generating circuit designated 256 which produces ultor voltage for kinescope 220 and also produces a sawtooth deflection current through horizontal deflection coils 258 associated with kinescope 220.

The phase-lock loop is closed by coupling the FH output of counter 254 to a second input of AND gate 34 and, by way of an inverter 236, to a second input of AND gate 32.

Logic circuit 260 includes an AND gate 266, one input of which is coupled to conductor A and the output of which is conductor G. An output is taken from logic circuit 222 in a manner similar to that described in conjunction with FIG. 1 and is applied over a conductor E to a second input of AND gate 226 to inhibit gate 266 during at least the vertical synchronizing and equalizing pulse intervals. During those intervals, gate 266 cannot pass horizontal synchronizing signals to phase detector 230 and AND gates 232 and 234 are therefore inhibited. With gates 232 and 234 inhibited, current sources 242 and 244 are also inhibited. With sources 242 and 244 inhibited, loop filter 240 can be neither charged nor discharged, and therefore retains the same voltage throughout the vertical synchronizing and equalizing pulse intervals. The VCO frequency, therefore, remains unchanged. Consequently, the receiver is synchronized with the synchronizing information occurring during the video interval and ignores that information received during at least the vertical synchronizing and equalizing pulse intervals.

Figure 3:
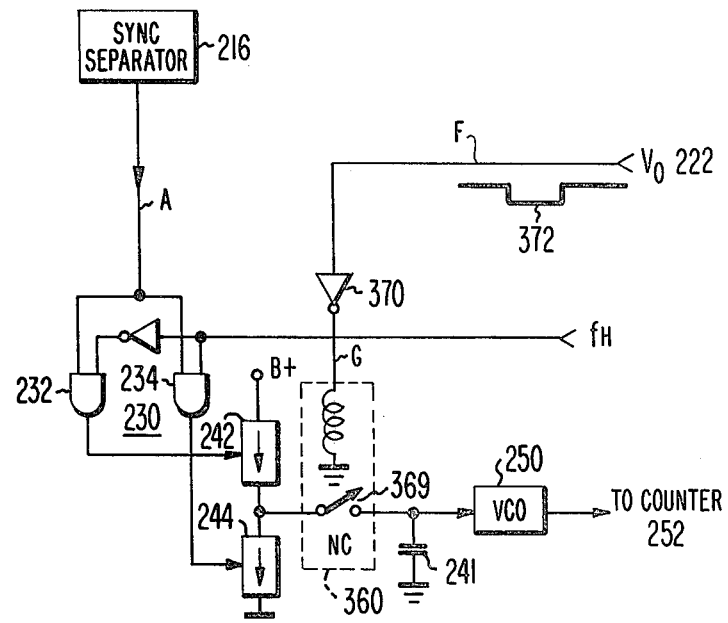
FIG. 3 illustrates another arrangement in which a gate is used to inhibit the phase detector.

FIG. 3 illustrates an alternative embodiment in which a gate coupled to the output of a phase detector inhibits the operation of the phase-lock loop. In FIG. 3, elements corresponding to those of FIG. 2 are designated by the same reference number. Sync separator 216 is coupled to phase detector 230 by a conductor A. Consequently, detector 230 responds by gating current sources 242 and 244 into conduction as required to maintain VCO 250 in sync. The output of phase detector 230 is coupled to filter 241 through a gate represented by the normally-closed contacts 369 of a relay 360. The coil of relay 360 is driven from logic circuit 222 through an inverting amplifier 370. A negative-going gate 372 is produced by logic circuit 222 during at least the vertical synchronizing and equalizing pulse intervals, is inverted by amplifier 370 and opens contacts 369, thereby interrupting the flow of current from current sources 242 and 244 to capacitor 241 for the duration of that interval.

Figure 4:
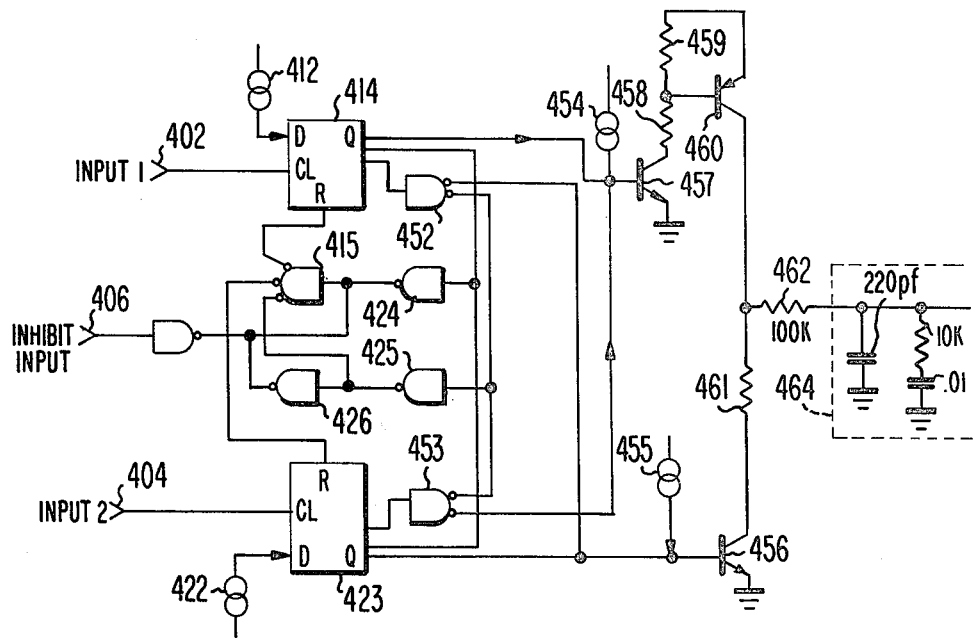
FIG. 4 illustrates a phase detector arrangement which may be used in the arrangement of FIG. 1.

FIG. 4 illustrates in schematic diagram form a phase detector suitable for implementation in integrated injection logic (I²L) form. This phase detector is advantageous in that it operates on the leading edges of the sync pulse being compared and is therefore less affected by the duration of the sync pulses than is the arrangement of FIGS. 2 or 3. In integrated injection logic, each input has an integrated current injector which is generally not shown on the diagram. A logic 1 condition at the output of a circuit is an open-circuit, and a logic 0 is a short to ground.

The operation of the arrangement of FIG. 4 is described assuming that input terminal 402 receives synchronizing signals and the output signal of a controlled VCO drives input terminal 404. Flip-flop (FF) 414 has its D input coupled to an integrated injector 412. Each time a positive-going edge of a sync signal is applied to the clock (CL) input of FF 414, its output goes to logic 1 (open-circuit), and this allows injector 454 coupled to the base of transistor 457 to turn the transistor ON. With transistor 457 ON, base current is supplied to transistor 460 by way of a voltage divider 458, 459, to switch transistor 460 ON. Current is supplied to loop filter 464 way of a limiting resistor 462. When the VCO produces a pulse at input terminal 404, the leading edge of the pulse triggers FF 423, setting its Q outputs to logic 1. Transistor 456 is not turned ON, however, because gate 452 still has a logic 1 at its input and holds the base of transistor 456 low. The Q output of FF 43 is applied to the input of inverter 424, which produces a logic 0 at the input of NAND 415. The outputs of NAND 415 go to logic 1, resetting FF 414 and 423 and turning OFF transistors 457 and 460. Gate 415 is coupled with gate 426 as a latch which holds FF 414 and 423 reset momentarily. Gate 425 senses a logic 0 output from both FF 414 and 423 to produce a logic 1 which resets the latch and releases the FF reset, then preparing the system for the next pulse set.

In the event that the VCO input pulse applied to terminal 404 leads the sync pulse applied to terminal 402, transistor 456 is turned ON by FF 423 to discharge the capacitors of filter 464, and is then turned OFF by the next following leading edge of a sync pulse.

A positive inhibit pulse applied to terminal 406 produces a logic 1 at the output of gate 415, which holds FF 414 and 423 reset, thereby inhibiting transistors 456, 457 and 460 and preventing charge or discharge of filter 464.

What is claimed is:
1. An improved television synchronizing apparatus adapted for generating internal vertical and horizontal synchronizing signals from a source of external composite vertical and horizontal synchronizing signals which may be nonstandard comprising:
   phase detection means including a first input coupled to the source of external signals for comparing the phase of said external signals with signals applied to a second input for producing control signal indicative of their relative phase;
   filter means coupled to said phase detector for filtering said control signal to form a second control signal;
   controllable oscillator means coupled to said filter means for producing oscillations at a frequency under the control of said second control signal,
   first counting means coupled to said oscillator and to said phase detection means for forming a phase-lock loop, said first counting means counting said oscillations to produce internal horizontal-rate synchronizing signals phase-locked to said external horizontal synchronizing signals;
   resettable second counting means coupled to said first counting means for producing internal vertical synchronizing signals in synchronism with said external vertical synchronizing signals wherein the improvement comprises inhibiting means coupled to said phase detection means and to said resettable counting means for inhibiting operation of said phase detection means during at least the equalizing and vertical synchronizing portions of said external synchronizing signals.

2. Apparatus according to claim 1 wherein said inhibiting means comprises gate means coupled to said phase detection means and to said resettable counting means for preventing generation of said unprocessed control signal during said equalizing and vertical synchronizing portions of said external synchronizing signals.

3. Apparatus according to claim 2 wherein said gate means is further coupled to said source of external composite vertical and horizontal synchronizing signals for inhibiting application of synchronizing signals to said phase detection means during said equalizing and vertical synchronizing portions of said external synchronizing signals.

* * * * *